(12) United States Patent
Liao et al.

(10) Patent No.: US 7,608,858 B2
(45) Date of Patent: Oct. 27, 2009

(54) SPACING ARCHITECTURE FOR LIQUID CRYSTAL DISPLAY AND SPACING METHOD THEREOF

(75) Inventors: Chia-Te Liao, Kaohsiung (TW);
Tean-Sen Jen, Pingjhen (TW); Hsu-Ho Wu, Tainan (TW); Ming-Tien Lin, Lujhou (TW); Te-Cheng Chung, Jhongli (TW)

(73) Assignee: HannStar Display Corporation, Yang-Mei (TW)

( * ) Notice: Subject to any disclaimer, the term of this patent is extended or adjusted under 35 U.S.C. 154(b) by 123 days.

(21) Appl. No.: 11/448,378

(22) Filed: Jun. 6, 2006

(65) Prior Publication Data
US 2007/0278491 A1    Dec. 6, 2007

(51) Int. Cl.
*H01L 29/04* (2006.01)

(52) U.S. Cl. .......................... 257/72; 257/414; 257/57; 257/59; 257/290; 257/351; 257/368; 257/392; 257/E21.527; 257/99; 257/98; 349/155; 349/153

(58) Field of Classification Search .................. 257/88, 257/93, 98, 100, 59, 57, 290, 351, 368, E21.527; 349/153, 155
See application file for complete search history.

(56) References Cited

U.S. PATENT DOCUMENTS

| 6,724,447 | B2 * | 4/2004 | Kim ............................ 349/106 |
| 7,206,057 | B2 * | 4/2007 | Yoo et al. ..................... 349/156 |
| 7,292,304 | B2 * | 11/2007 | Kim et al. .................... 349/156 |
| 2007/0247584 | A1 * | 10/2007 | Li et al. ........................ 349/156 |

* cited by examiner

*Primary Examiner*—Wael Fahmy
*Assistant Examiner*—Marc Armand
(74) *Attorney, Agent, or Firm*—Volpe and Koenig, P.C.

(57) ABSTRACT

A liquid crystal display is provided. A liquid crystal display includes a first substrate having color filters therewith; a second substrate having plural first signal lines and plural second signal lines thereon; plural first openings located at intersections of said first signal lines and plural of second signal lines; and plural supports located at said plural first openings and between said first substrate and said second substrate, and separating said first substrate from said second substrate.

19 Claims, 8 Drawing Sheets

SPACING ARCHITECTURE FOR LIQUID CRYSTAL DISPLAY AND SPACING METHOD THEREOF

FIELD OF THE INVENTION

The present application relates to a spacing architecture, and more particularly to the spacing architecture of the liquid crystal display and the spacing method thereof.

BACKGROUND OF THE INVENTION

With the speedy improvement of the photoelectric technique, the liquid crystal display has been widely applied to human's daily life. However, it is needed a support between two glass substrates so as to provide a space or a gap therebetween in order to contain a liquid crystal layer therein. Therefore an element, termed as spacer or separator, which takes up space but does not display anything, is placed between two glass substrates.

Typically the spacer are plastic resin and are in a trapezoid shape but also possibly in a ball, bar shape or otherwise. However, there is a severe shortcoming for this conventional manner for placing spacers as described following. Once an external force is applied to the LCD panel, the spacer is displaced to location but unable to be homed to its original location and consequently Push Mura is arisen. It will also result in light leakage due to the dislocation of the patterns of upper and lower substrates.

As above, a new spacer architecture and spacing method in order to prevent light leakage resulted from push Mura are desired.

SUMMARY OF THE INVENTION

In accordance with one aspect of the present application, a liquid crystal display is provided. A liquid crystal display includes a first substrate having color filters therewith; a second substrate having plural first signal lines and plural second signal lines thereon; plural first openings located at intersections of said first signal lines and plural of second signal lines; and plural supports located at said plural first openings and between said first substrate and said second substrate, and separating said first substrate from said second substrate.

In accordance with other aspect of the present application, spacing architecture for providing a space in a liquid crystal display is provided. A spacing architecture for providing a space in a liquid crystal display having a first substrate with plural color filters and a second substrate with plural gate lines and plural data lines crossing each other opposite thereto includes plural supports located at intersections of plural gate lines and plural data lines, disposed between said first substrate and said second substrate and spanned one of said plural gate lines and said plural data lines.

The foregoing and other features and advantages of the present invention will be more clearly understood through the following descriptions with reference to the drawings, wherein:

BRIEF DESCRIPTION OF THE DRAWING

FIGS. 1a and 1b respectively illustrate the spacing architecture in a liquid crystal display according to a first preferred embodiment of the present invention and the cross-sectional view along the AA' line in FIG. 1a;

FIGS. 2a and 2b respectively illustrate the spacing architecture in a liquid crystal display according to a second preferred embodiment of the present invention and the cross-sectional view along the AA' line in FIG. 2a;

FIGS. 3a and 3b respectively illustrate the spacing architecture in a liquid crystal display according to a third preferred embodiment of the present invention and the cross-sectional view along the AA' line in FIG. 3a;

FIGS. 4a and 4b respectively illustrate the spacing architecture in a liquid crystal display according to a fourth preferred embodiment of the present invention and the cross-sectional view along the AA' line in FIG. 4a;

FIGS. 5a and 5b respectively illustrate the spacing architecture in a liquid crystal display according to a fifth preferred embodiment of the present invention and the cross-sectional view along the AA' line in FIG. 5a; and FIGS. 6a and 6b respectively illustrate the spacing architecture in a liquid crystal display according to a sixth preferred embodiment of the present invention and the cross-sectional view along the AA' line in FIG. 6a.

DETAILED DESCRIPTION OF THE PREFERRED EMBODIMENTS

The present application will now be described more specifically with reference to the following embodiments. It is to be noted that the following descriptions of preferred embodiments of this application are presented herein for the aspect of illustration and description only; it is not intended to be exhaustive or to be limited to the precise form disclosed.

Figure 1A:
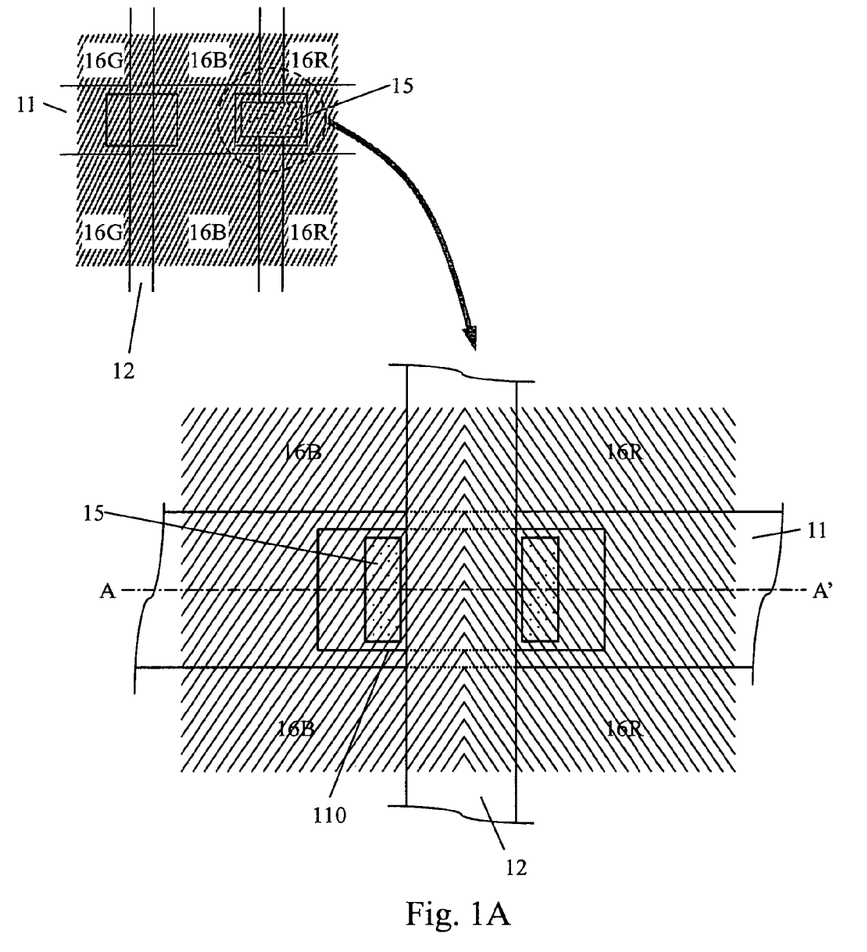
Figure 1B:
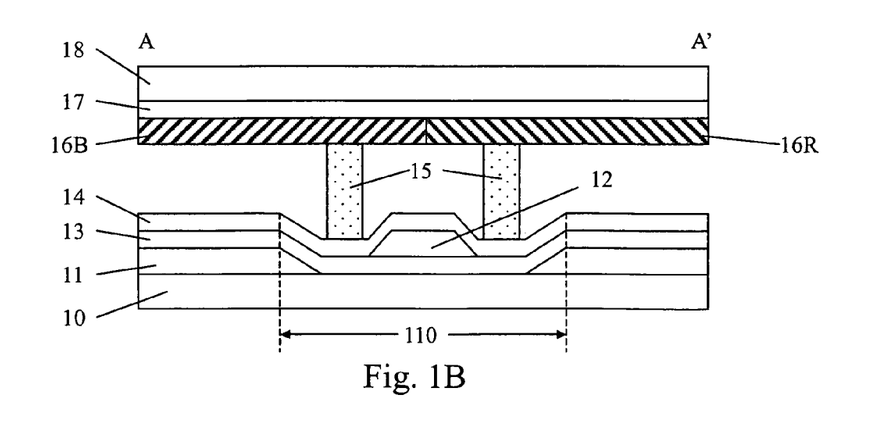

Please refer to FIGS. 1a-1b, which respectively illustrate the spacing architecture in a liquid crystal display according to a first preferred embodiment of the present invention and the cross-sectional view along the AA' line in FIG. 1a. The liquid crystal display includes a first substrate 18, a second substrate 10 and a liquid crystal layer (not shown) formed between, wherein the first substrate is an upper glass substrate having plural color filter layers therewith, such as 16R, 16G and 16B; and the second substrate is a lower glass substrate having plural first signal lines 11, such as gate lines, and plural second signal lines 12, such as data lines thereon for defining plural pixel regions. Furthermore, plural spacers 15 are interposed between the second substrate 10 and the first substrate 18, for separating the second substrate 10 from the first substrate 18 so as to provide a space or a gap therebetween.

The features of the present application are described as follows. As shown in FIG. 1a, plural first openings 110 are located at intersections of the plural first signal lines 11 and plural second signal lines 12, and at least two of the plural spacers 15 are arranged at one of the plural first openings 110. Please further refer to FIG. 1b. At the lower portion, the first signal lines 11 are formed above the second substrate 10 and an insulator layer 13 is formed above the first signal lines 11 and the second substrate 10. The second signal lines 12 are formed above the insulator 13 and plural bumps are consequently formed at intersections, wherein each bump comprises one of the second signal lines 12. A passivation layer 14 is then covered over the second signal lines 12 and formed above the insulator layer 13. It is apparent that plural first openings 110 will provide specific spaces at both sides of the bumps for containing said plural spacers 15. In the other word, each first opening 110 is formed on the one of first signal line 11 and second signal line 12 at intersection. At the upper portion, the shape of said plural spacers 15 is dependent on the profile of said plural color filters 16R, 16G, 16B. There are plural black matrixes 17 are implemented on first substrate 18 and located at non-display area opposite to the plural first signal lines 11, the plural second signal lines 12 and the plural first openings 110 of the second substrate 10 in order to prevent light leakage.

According to the invention, a spacing architecture including at least two of the plural supports (e.g. spacers 15) right located at one of the first openings 110 at the intersection of plural first signal lines 11 and plural second signal lines 12 provides offset thus prevent push mura defects when an extra force, such as finger wiping, temporarily applied. Except that, any two of the spacers 15 symmetrically aligned at the first opening have a specific distance therebetween so as to effectively increase the density of the supports (e.g. spacers 15) at the intersection of the signal lines and fix the deviation of the supports (e.g. spacers 15) by the profile of the first opening. Furthermore, the bump between said two of the supports (e.g. spacers 15) in the first opening more effectively fixes the shift margin between the first substrate 18 and the second substrate 10 within a specific region that is no light leakage. Basically, FIG. 1 provides a standard prototype for the coming cases shown in the follows.

Figure 2A:
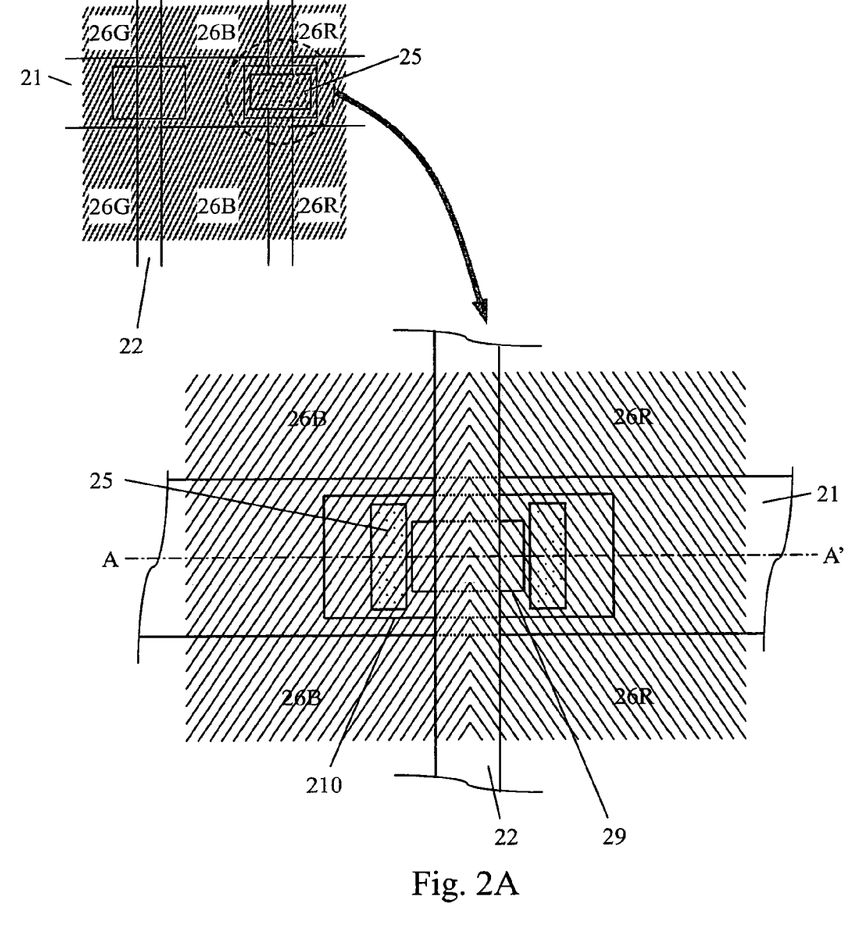
Figure 2B:
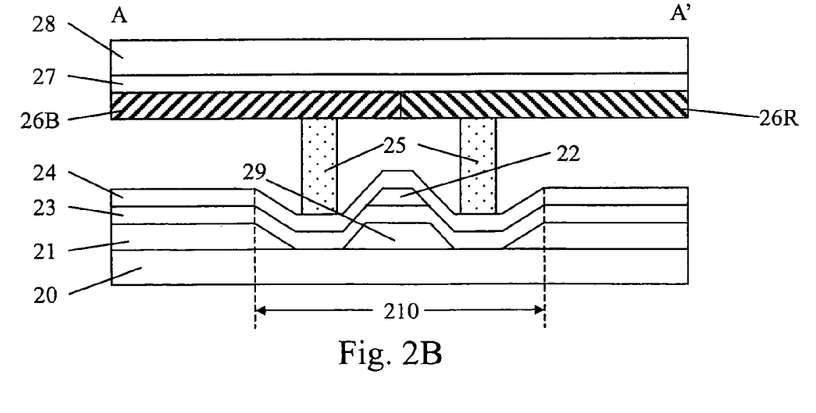

Please refer to FIGS. 2a-2b, which respectively illustrate the spacing architecture in a liquid crystal display according to a second preferred embodiment of the present invention and the cross-sectional view along the AA' line in FIG. 2a. The liquid crystal display includes a first substrate 28, a second substrate 20 and a liquid crystal layer (not shown) formed between, wherein the first substrate is an upper glass substrate having plural color filter layers therewith, such as 26R, 26G and 26B; and the second substrate is a lower glass substrate having plural first signal lines 21, such as gate lines, and plural second signal lines 22, such as data lines thereon for defining plural pixel regions. Furthermore, plural spacers 25 are interposed between the second substrate 20 and the first substrate 28, for separating the second substrate 20 from the first substrate 28 so as to provide a space or a gap therebetween.

The features of the present application are described as follows. As shown in FIG. 2a, the plural spacers 25 are located at intersections of the plural first signal lines 21 and plural second signal lines 22, plural first openings 210 are located one of first signal lines 21 and second signal lines 22 at intersections, and at least two of the plural spacers 25 are arranged at one of the plural first openings 210. Please further refer to FIG. 2b. At the lower portion, the first signal lines 21 are formed above the second substrate 20 and a stuffing (floating metal) layer 29 is formed above the second substrate 20. An insulator layer 23 is formed above the first signal line 21, the second substrate 20 and the stuffing layer 29. The second signal lines 22 are formed above the insulator 23 and overlapped with the stuffing layer 29 so as to form plural bumps at intersections. The altitude of the plural bumps formed in FIG. 2b is higher than that in FIG. 1b since the stuffing layer 29 is added therein. A passivation layer 24 is then covered over the second signal lines 22 and formed above the insulator layer 23. It is apparent that plural first openings 210 will provide specific spaces at both sides of the bumps for containing said plural spacers 25. At the upper portion, the shape of said plural spacers 25 is dependent on the profile of said plural color filters 26R, 26G, 26B. There are plural black matrixes 27 are implemented on first substrate 28 and located at non-display area opposite to the plural first signal lines 21, the plural second signal lines 22 and the plural first openings 210 of the second substrate 20 in order to prevent light leakage.

According to the invention, a spacing architecture including at least two of the plural supports (e.g. spacers 25) right located at one of the first openings 210 at the intersection of plural first signal lines 21 and plural second signal lines 22 provides offset thus prevent push mura defects when an extra force, such as finger wiping, temporarily applied. Except that, any two of the supports (e.g. spacers 25) symmetrically aligned at the first opening have a specific distance therebetween so as to effectively increase the density of the supports (e.g. spacers 25) at the intersection of the signal lines and fix the deviation of the supports (e.g. spacers 25) by the profile of the first opening. Furthermore, the bump between said two of the supports (e.g. spacers 25) in the first opening more effectively fixes the shift margin between the first substrate 28 and the second substrate 20 within a specific region that is no light leakage. Basically, FIG. 2 is derived based upon the standard prototype providing in FIG. 1.

Figure 3A:
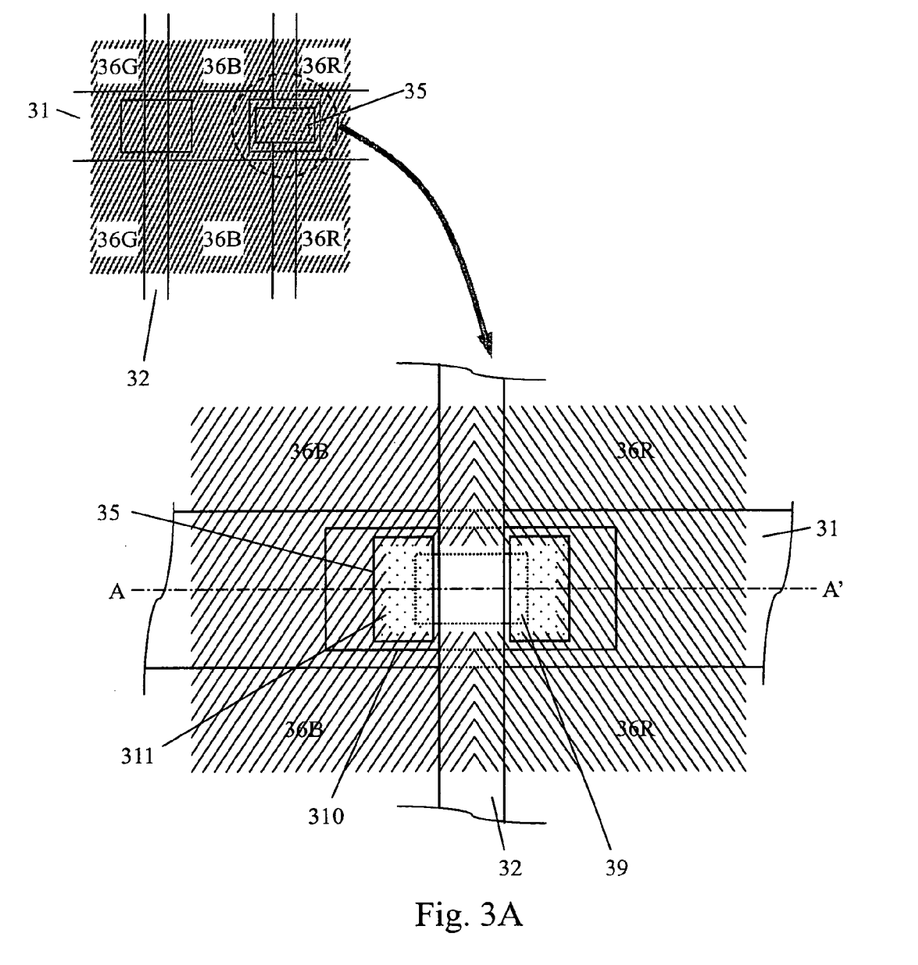
Figure 3B:
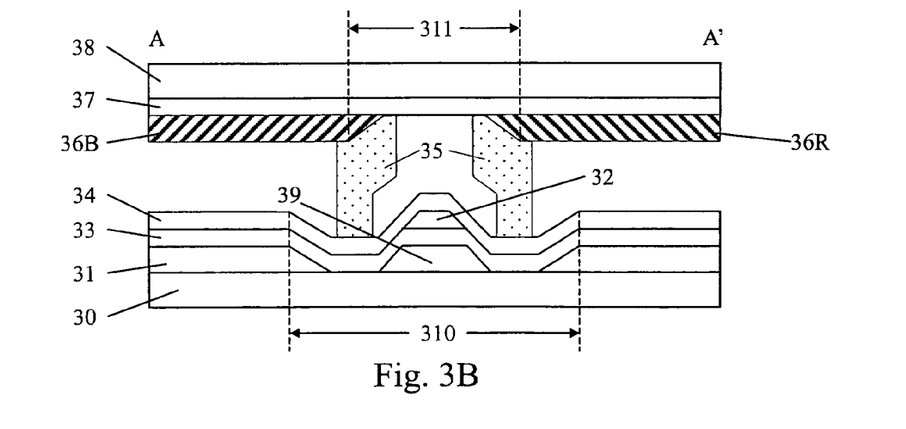

Please refer to FIGS. 3a-3b, which respectively illustrate the spacing architecture in a liquid crystal display according to a third preferred embodiment of the present invention and the cross-sectional view along the AA' line in FIG. 3a. The liquid crystal display includes a first substrate 38, a second substrate 30 and a liquid crystal layer (not shown) formed between, wherein the first substrate is an upper glass substrate having plural color filter layers therewith, such as 36R, 36G and 36B; and the second substrate is a lower glass substrate having plural first signal lines 31, such as gate lines, and plural second signal lines 32, such as data lines thereon for defining plural pixel regions. Furthermore, plural spacers 35 are interposed between the second substrate 30 and the first substrate 38, for separating the second substrate 30 from the first substrate 38 so as to provide a space or a gap therebetween.

The features of the present application are described as follows. As shown in FIG. 3a, plural second openings 311 are located between every two of plural color filters, the plural spacers 35 are located at intersections of the plural first signal lines 31 and plural second signal lines 32, plural first openings 310 are located one of first signal lines 31 and second signal lines 32 at intersections, and at least two of the plural spacers 35 are arranged at one of the plural first openings 310, wherein the second openings 311 on the first substrate 38 are opposite to the first openings on the second substrate 30, the shape of said second openings 311 is similar to that of said first openings 310, and said second openings 311 are within said first openings 310. Please further refer to FIG. 3b. At the lower portion, the first signal lines 31 are formed above the second substrate 30 and a stuffing (floating metal) layer 39 is formed above the second substrate 30. An insulator layer 33 is formed above the first signal line 31, the second substrate 30 and the stuffing layer 39. The second signal lines 32 are formed above the insulator 33 and overlapped with the stuffing layer 39 so as to form plural bumps at intersections. In the other words, these plural spacers 35 located at the first openings are symmetrically aligned the bumps. A passivation layer 34 is then covered over the second signal lines 32 and formed above the insulator layer 33. It is apparent that plural first openings 310 will provide specific spaces at both sides of the bumps for containing said plural spacers 35. At the upper portion, there exist plural second openings 311 between every two of plural color filters 36R, 36G, 36B and the shape of said plural spacers 35 is dependent on the profile of said plural color filters 36R, 36G, 36B, thus any plural spacers 35 surrounding the second openings 311 have a step profile. There are plural black matrixes 37 are implemented on first substrate 38 and located at non-display area opposite to the plural first signal lines 31, the plural second signal lines 32 and the plural first openings 310 of the second substrate 30 in order to prevent light leakage.

According to the invention, a spacing architecture including at least two of the plural supports (e.g. spacers 35) with step profiles right located between one of the first openings 310 and one of the second opening 311 at the intersection of plural first signal lines 31 and plural second signal lines 32 provides efficient offset thus prevent push mura defects when an extra force, such as finger wiping, temporarily applied. Except that, any two of the supports. (e.g. spacers 35) at the first opening 310 and the second opening 311 have a specific distance therebetween so as to effectively increase the density of the supports (e.g. spacers 35) at the intersection of the signal lines and fix the deviation of the supports (e.g. spacers 35) by the profile of the first opening and second opening. Furthermore, the bump between said two of the supports (e.g. spacers 35) in the first opening and the second opening more effectively fixes the shift margin between the first substrate 38 and the second substrate 30 within a specific region that is no light leakage. Basically, FIG. 3 is derived based upon the modified case providing in FIG. 2.

Please refer to FIGS. 4a-4b, which respectively illustrate the spacing architecture in a liquid crystal display according to a forth preferred embodiment of the present invention and the cross-sectional view along the AA' line in FIG. 4a. The liquid crystal display includes a first substrate 48, a second substrate 40 and a liquid crystal layer (not shown) formed between, wherein the first substrate is an upper glass substrate having plural color filter layers therewith, such as 46R, 46G and 46B; and the second substrate is a lower glass substrate having plural first signal lines 41, such as gate lines, and plural second signal lines 42, such as data lines thereon for defining plural pixel regions. Furthermore, plural spacers 45 are interposed between the second substrate 40 and the first substrate 48, for separating the second substrate 40 from the first substrate 48 so as to provide a space or a gap therebetween.

Figure 4A:
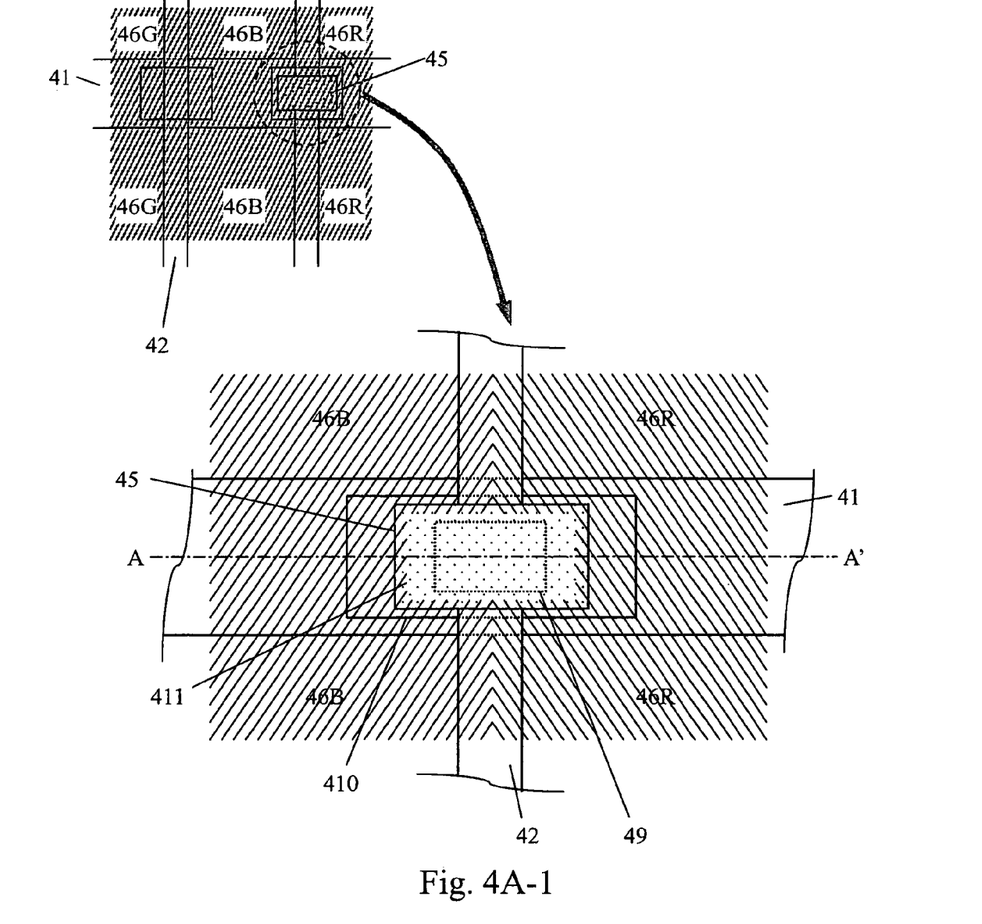
Figure 4A:
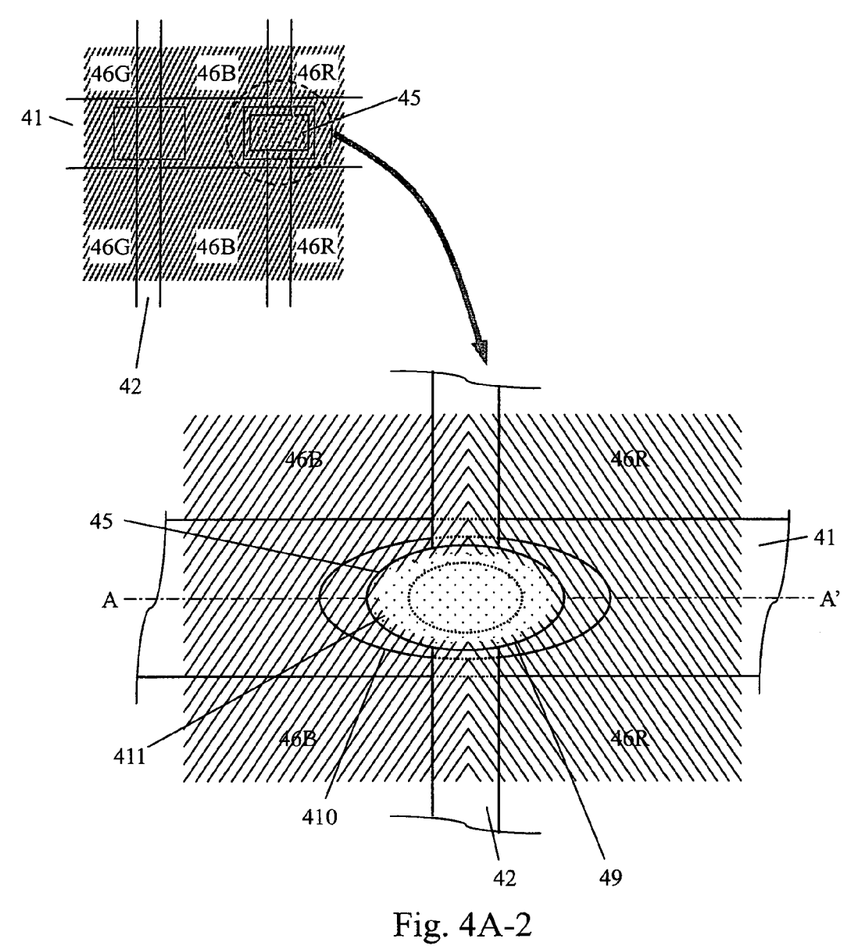

The features of the present application are described as follows. As shown in FIGS. 4a-1 and 4a-2, plural second openings 411 are located between every two of plural color filters, the plural spacers 45 are located at intersections of the plural first signal lines 41 and plural second signal lines 42, plural first openings 410 are located one of said first signal lines 41 and said second signal lines 42 at intersections, and at least two of the plural spacers 45 are connected each other at one of the plural first openings 410, wherein the second openings 411 on the first substrate 48 is opposite to the first openings on the second substrate 40, the shape of said second openings 411 is similar to that of said first openings 410 and said second openings 411 are within said first openings 410. Furthermore, the shape of the first opening 410 and the second opening spacers 45 could be circular, elliptic or polygonal such as rectangular as shown in FIGS. 4a-1 and 4a-2, and otherwise possible shape suit in the circumstance.

Figure 4B:
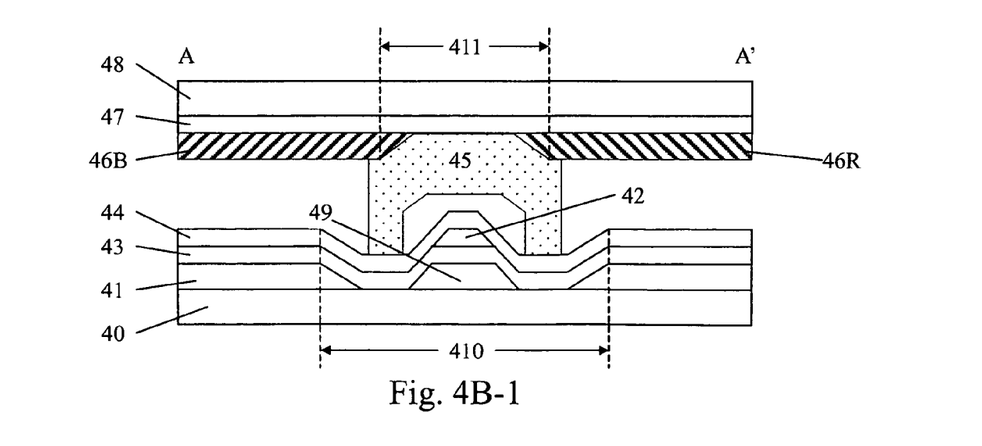
Figure 4B:
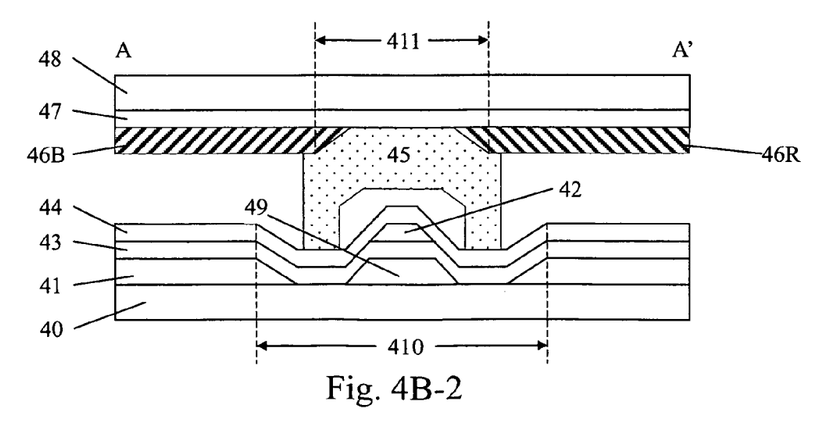

Please further refer to FIGS. 4b-1 and 4b-2. At the lower portion, the first signal lines 41 are formed above the second substrate 40 and a stuffing (floating metal) layer 49 is formed above the lower glass second substrate 40. An insulator layer 43 is formed above the first signal line 41, the second substrate 40 and the stuffing layer 49. The second signal lines 42 are formed above the insulator 43 and overlapped with the stuffing layer 49 so as to form plural bumps at intersections. In the other words, these plural spacers 45 located at the first openings 410 are symmetrically aligned the bumps. A passivation layer 44 is then covered over the second signal lines 42 and formed above the insulator layer 43. It is apparent that plural first openings 410 will provide specific spaces at both sides of the bumps for containing said plural spacers 45. At the upper portion, there exist plural second openings 411 between every two of plural color filters 46R, 46G and 46B and said plural spacers 45 located at one of the plural first openings 410 are connected each other to form a bulk (united) spacer. Due to the shape of said plural spacers 45 corresponded to the profile of said plural color filters 46R, 46G and 46B, thus the bulk spacer could be a rectangular with a hollow or a circular with a hollow the according to the shape of the second opening 411 between every two of plural color filters. There are plural black matrixes 47 are implemented on first substrate 48 and located at non-display area opposite to the plural first signal lines 41, the plural second signal lines 42 and the plural first openings 410 of the second substrate 40 in order to prevent light leakage.

According to the invention, a spacing architecture including at least two of the plural supports (e.g. spacers 45) spanned one of said plural first signal lines 41 and said plural second signal lines 42 as a bulk spacer with a hollow is right located at one of the second openings 411 at the intersection and provides efficient offset thus well prevent push mura defects when an extra force, such as finger wiping, temporarily applied. Furthermore, said bulk spacer is spanned the bump at said first opening and has two ends contacting the second substrate 30 so as to effectively increase the density of the supports (e.g. spacers 45) at the intersection of the signal lines and fix the deviation of the supports (e.g. spacers 45) by the profile of the first opening. Thus, it more effectively fixes the shift margin between the first substrate 48 and the second substrate 40 within a specific region that is no light leakage.

Figure 5A:
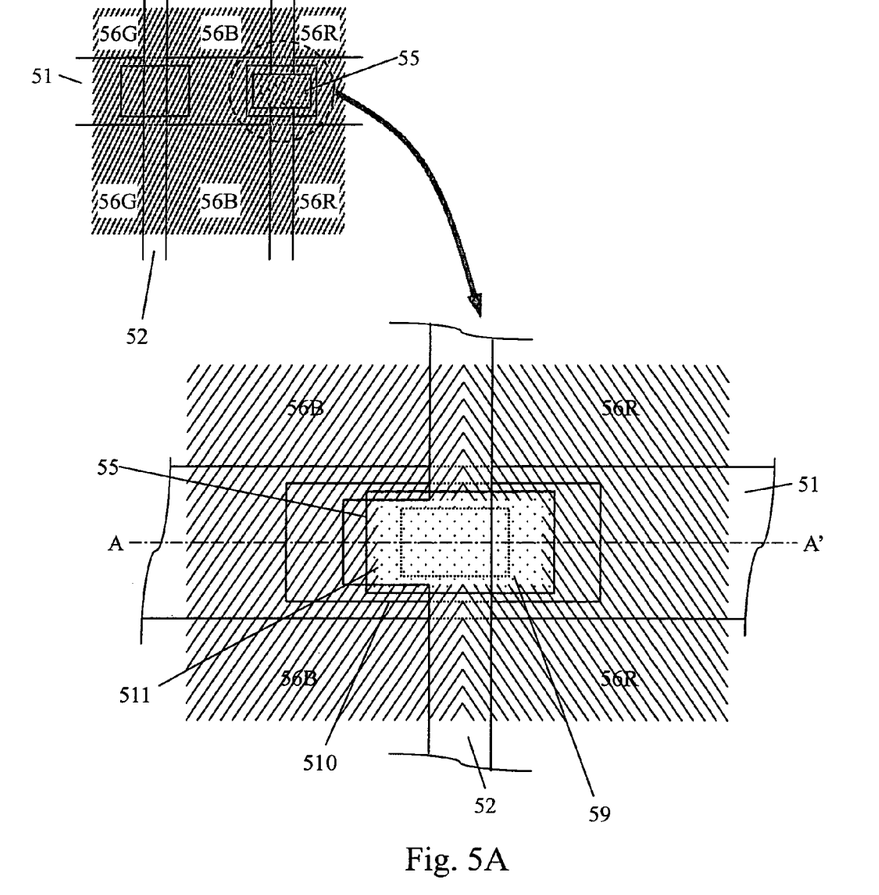
Figure 5B:
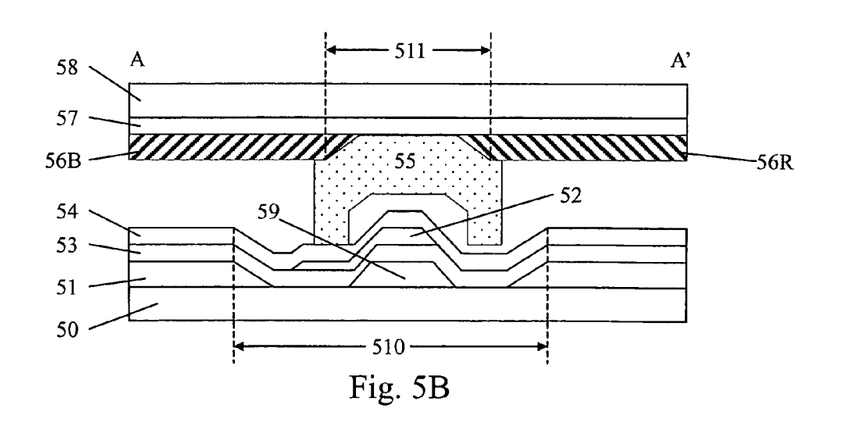

Please refer to FIGS. 5a-5b, which respectively illustrate the spacing architecture in a liquid crystal display according to a fifth preferred embodiment of the present invention and the cross-sectional view along the AA' line in FIG. 5a. The liquid crystal display includes a first substrate 58, a second substrate 50 and a liquid crystal layer (not shown) formed between, wherein the first substrate is an upper glass substrate having plural color filter layers therewith, such as 56R, 56G and 56B; and the second substrate is a lower glass substrate having plural first signal lines 51, such as gate lines, and plural second signal lines 52, such as data lines thereon for defining plural pixel regions. Furthermore, plural spacers 55 are interposed between the second substrate 50 and the first substrate 58, for separating the second substrate 50 from the first substrate 58 so as to provide a space or a gap therebetween.

The features of the present application are described as follows. As shown in FIG. 5a, plural second openings 511 are located between every two of plural color filters, the plural spacers 55 are located at intersections of the plural first signal lines 51 and plural second signal lines 52, plural first openings 510 are located one signal lines at intersections, such as said first signal lines 51, the other one signal lines, such as said second signal lines 52, having an extension portion at intersections, at least two of the plural spacers 55 are connected each other at one of the plural first openings 510, wherein the second openings 511 on the first substrate 58 are opposite to the first openings on the second substrate 50, the shape of said second openings 511 is similar to that of said first openings 510 and said second openings 511 are within said first openings 510.

Please further refer to FIG. 5b. Simply describe one spacing architecture as the following: at the lower portion, the first signal line 51 is formed above the second substrate 40 and a stuffing (floating metal) layer 59 is formed above the second substrate 50. An insulator layer 53 is formed above the first signal line 51, the second substrate 50 and the stuffing layer 59. The second signal line 52 is formed above the insulator 53 and overlapped with the stuffing layer 59 so as to form a bump at intersection, whereas the second signal line 52 is extended toward any one side of the first signal line 51 at the location of the first opening 510 so as to heighten the altitude at the said side of the first opening 510. A passivation layer 54 is then covered over the second signal lines 52 and formed above the insulator layer 53. It is apparent that plural first openings 510 will provide specific spaces at both sides of the bumps for containing said plural spacers 55. At the upper portion, there exists a second opening 511 between every two of plural color filters 56R, 56G, 56B, said plural spacers 55 symmetrically aligned the bump at said first openings 510 are connected each other to form a bulk (united) spacer, and the bulk spacer with a hollow is corresponded to the profile of said plural color filters 56R, 56G, 56B. Furthermore, said bulk spacer is spanned the bump at said first opening and has two ends: one contacts the second substrate 50 and the other one is suspended by only one side extension portion of said second signal line 52 so as to simultaneously increase elastic buffer. There are plural black matrixes 57 are implemented on first substrate 58 and located at non-display area opposite to the plural first signal lines 51, the plural second signal lines 52 and the plural first openings 510 of the second substrate 50 in order to prevent light leakage.

According to the invention, a spacing architecture including at least two of the plural supports (e.g. spacers 55) spanned one of said plural first signal lines 51 and said plural second signal lines 52 is right located at one of the second openings 511 at the intersection, wherein two of said plural supports (e.g. spacers 55) are located at said one of plural first openings and connected each other: one is overlapping with said extension portion from the second signal line, and the other is suspended so as to effectively increase the density of the supports (e.g. spacers 55) at the intersection of the signal lines and fix the deviation of the supports (e.g. spacers 55) by the profile of the first opening and the bump thus well prevent push mura defects when an extra force, such as finger wiping, temporarily applied. Thus, it more effectively fixes the shift margin between the first substrate 58 and the second substrate 50 within a specific region that is no light leakage. Further the suspended supports (e.g. spacers 55) as aforementioned adequately release the possible redundant friction force provided thereof. Basically, FIG. 5 shows a possibly variation case derived from what is disclosed in FIG. 4.

Please refer to FIGS. 6a-6b, which respectively illustrate the spacing architecture in a liquid crystal display according to a sixth preferred embodiment of the present invention and the cross-sectional view along the AA' line in FIG. 6a. The liquid crystal display includes a first substrate 68, a second substrate 60 and a liquid crystal layer (not shown) formed between, wherein the first substrate is an upper glass substrate having plural color filter layers therewith, such as 66R, 66G, 66B; and the second substrate is a lower glass substrate having plural first signal lines 61, such as gate lines, and plural second signal lines 62, such as data lines thereon for defining plural pixel regions. However, when forming the plural color filters, there exist plural second openings 611 between every two of plural color filters where the shape of said second opening 611 is similar to that of said first opening 610 and said second opening 611 is within said first opening 610. Furthermore, plural spacers 65 are interposed between the second substrate 60 and the first substrate 68, for separating the second substrate 60 from the first substrate 68 so as to provide a space or a gap therebetween. The plural spacers 65 are spanned over one of said plural first signal lines 61 and plural second signal lines 62.

Figure 6A:
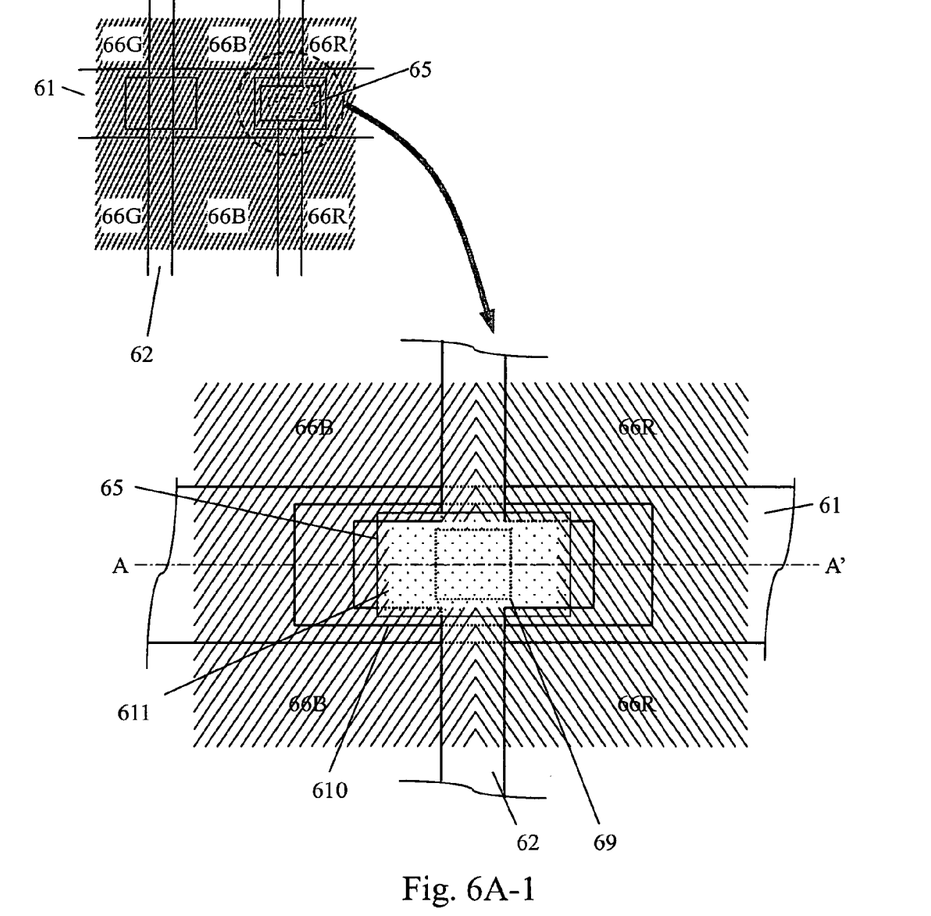
Figure 6A:
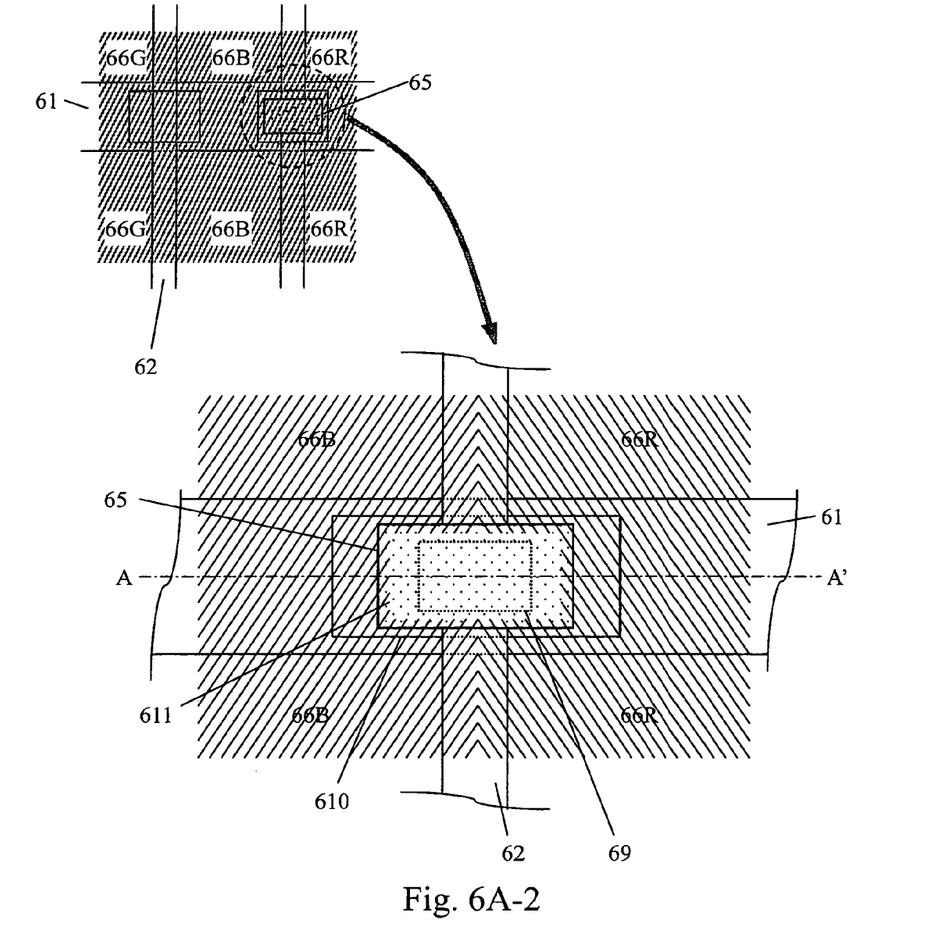

The features of the present application are described as follows. As shown in FIGS. 6a-1 and 6a-2, plural second openings 611 are located between every two of plural color filters, the plural spacers 65 are located at intersections of the plural first signal lines 61 and plural second signal lines 62, plural first openings 610 are located one signal lines at intersections, such as said first signal lines 61, some of the other one signal lines, such as said second signal lines 52, have an extension portion at intersections, at least two of the plural spacers 65 are connected each other at any one of the plural first openings 610, wherein a first connected two of said plural supports located at a first one of plural first openings are overlapping with said extension portion, and a second connected two of said plural supports located at a second one of plural first openings are without said extension portion. Except that, the second openings 611 on the first substrate 68 are opposite to the first openings on the second substrate 60, the shape of said second openings 611 is similar to that of said first openings 610 and said second openings 611 are within said first openings 610.

Please further refer to FIGS. 6b-1 and 6b-2. At the lower portion, the first signal lines 61 are formed above the second substrate 40 and a stuffing (floating metal) layer 69 is formed above the lower glass second substrate 60. An insulator layer 63 is formed above the first signal line 61, the second substrate 60 and the stuffing layer 69. In particular, in FIG. 6b-1, The second signal lines 62 are formed above the insulator 63 and overlapped with the stuffing layer 69 so as to form plural bumps, whereas the second signal lines 62 is symmetrically extended toward the both side of the first signal lines 61 upon the insulator 63 at the location of the first opening 610 so as to heighten the altitude at the both side of the first opening 610 so as to provide cell gap of the requirement. In particular, in FIG. 6b-2, the second signal lines 62 doesn't extend but adapt the implementation as disclosed in FIG. 4 so as to let the both end of the spacers suspended. Both cases in FIG. 6b-1 and FIG. 6b-2 are applied in alternatives or in combinations in order to provide the most appropriate friction force. The heighten altitude provides a support for the spacers 65 and one end of one of the spacers 65 becomes suspended as shown in FIG. 6b. A passivation layer 64 is then covered over the second signal lines 62 and formed above the insulator layer 63. It is apparent that plural first openings 610 will provide specific spaces at both sides of the bumps for containing said plural spacers 65.

Figure 6B:
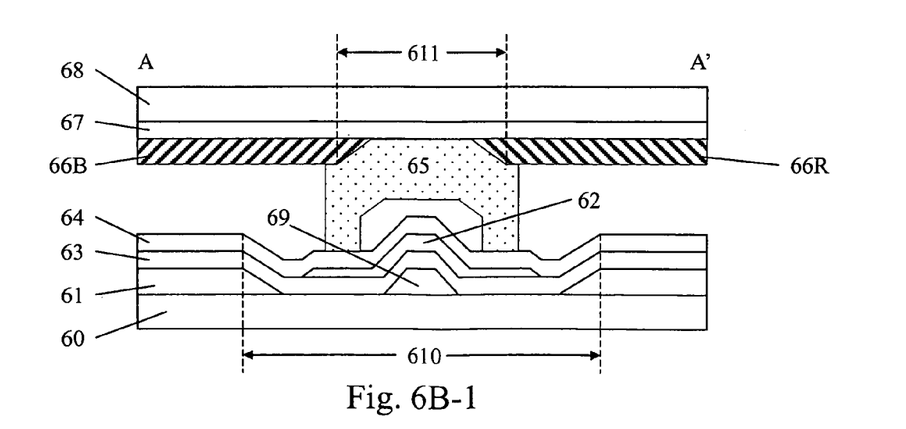
Figure 6B:
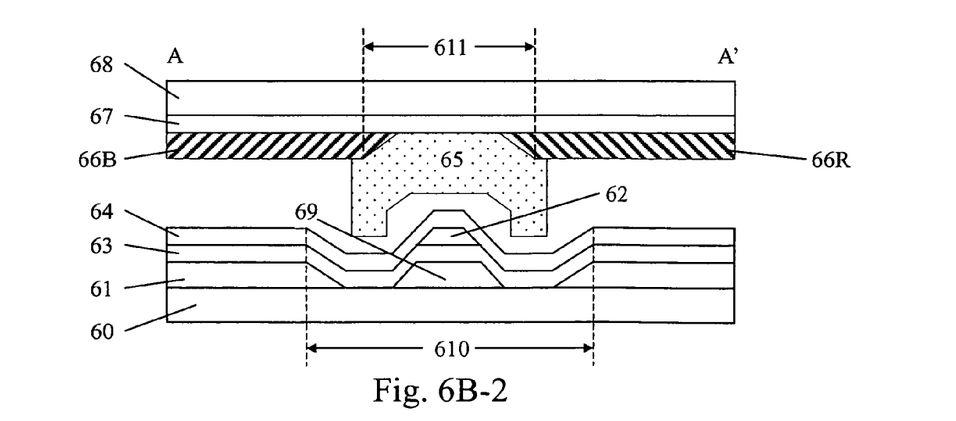

At the upper portion, there exist plural second openings 611 between every two of plural color filters 66R, 66G and 66B, said plural spacers 65 symmetrically aligned the bumps at said first openings 610 are connected each other to form plural bulk (united) spacers, and the bulk spacers with hollows are corresponded to the profile of said plural color filters 66R, 66G, 66B. Furthermore, said some of the bulk spacers contact the second substrate 60 and the others are suspended by extension portion of said second signal line 62 so as to simultaneously increase elastic buffer. There are plural black matrixes 67 are implemented on first substrate 68 and located at non-display area opposite to the plural first signal lines 61, the plural second signal lines 62 and the plural first openings 610 of the second substrate 60 in order to prevent light leakage.

According to the invention, a spacing architecture including at least two of the plural supports (e.g. spacers 65) spanned one of said plural first signal lines 61 and said plural second signal lines 62 is right located at one of the second openings 611 at the intersection, wherein said plural supports (e.g. spacers 65) are individually connected each other at any one first opening 610: a first connected two of said plural supports located at a first one of plural first openings are overlapping with said extension portion, and a second connected two of said plural supports is suspended at a second one of plural first openings are without said extension portion so as to effectively increase the density of the supports (e.g. spacers 65) at the intersection of the signal lines and fix the deviation of the supports (e.g. spacers 65) by the profile of the first opening and the bump thus well prevent push mura defects when an extra force, such as finger wiping, temporarily applied. Thus, it more effectively fixes the shift margin between the first substrate 68 and the second substrate 60 within a specific region that is no light leakage. Further the suspended supports (e.g. spacers 65) as aforementioned adequately release the possible redundant friction force provided thereof. Further the suspended spacers 65 as aforementioned adequately release the possible redundant friction force provided thereof.

In accordance with the aforementioned, the plural second openings 311, 411, 511 and 611 are in the shape of polygon or circle. As above, according to the spacer architecture of the present application, a push Mura phenomena in a liquid crystal display is well prevented or reduced, and collaterally the light leakage due to push Mura is eliminated. However, the spacers disclosed in this application are located at the intersections of the first signal lines and second signal lines which will not reduce the aperture ratio, as well as maintain a high display quality. Substantially, the present application does have the progressiveness, novelty and industrial utility.

While the application has been described in terms of what are presently considered to be the most practical and preferred embodiments, it is to be understood that the application need not be limited to the disclosed embodiment. On the contrary, it is intended to cover various modifications and similar arrangements included within the spirit and scope of the appended claims, which are to be accorded with the broadest interpretation so as to encompass all such modifications and similar architectures. Therefore, the above description and illustration should not be taken as limiting the scope of the present application which is defined by the appended claims.

What is claimed is:

1. A liquid crystal display, comprising:
    a first substrate having at least two color filters therewith;
    a second substrate having at least a first signal line thereon, wherein said first signal line is positioned between said second substrate and a second signal line, said first signal line having a first hole that penetrates said first signal line and is positioned at an intersection of said first and second signal lines, and said first hole is disposed under said second signal line and above said second substrate; and
    at least a first support positioned between said first and second substrates for separating said first substrate from said second substrate, a vertical projection of said first support is entirely within said first hole.

2. The liquid crystal display according to claim 1, wherein said second substrate further comprises an insulator layer between said first and second signal lines.

3. The liquid crystal display according to claim 1, wherein said second substrate further comprises a passivation layer over said second signal line, said passivation layer provides a concave space via said first opening, and said first support is located within said concave space of said passivation layer.

4. The liquid crystal display according to claim 1 further comprising a bump formed by said second signal line and located at the intersection of said first and second signal lines, wherein said first support is located between said bump and said first hole.

5. The liquid crystal display according to claim 1 further comprising a second hole positioned between said two color filters and located at said intersection of said first and second signal lines.

6. The liquid crystal display according to claim 1, where said second substrate is not contacted with said first support.

7. The liquid crystal display according to claim 1, wherein said first hole has one selected from a group consisting of circular, elliptic and polygonal shapes.

8. The liquid crystal display according to claim 1 further comprising a first extension portion extended from said second signal line, wherein said first extension portion is entirely located within said first hole, and a part of said first extension portion is overlapped with said first support.

9. The liquid crystal display according to claim 2 further comprising a floating layer overlapped with said second signal line and located between said insulator layer and said second substrate.

10. The liquid crystal display according to claim 4, wherein said bump is covered and surrounded by said first support.

11. The liquid crystal display according to claim 4 further comprising a second support located between said bump and said first hole and positioned between said first and second substrate for separating said first substrate from said second substrate.

12. The liquid crystal display according to claim 5, wherein said second hole is located above said first hole.

13. The liquid crystal display according to claim 5, wherein said first support is located at said second hole.

14. The liquid crystal display according to claim 5, wherein said second hole has one selected from a group consisting of circular, elliptic and polygonal shapes.

15. The liquid crystal display according to claim 8 further comprising a second support located within said first hole.

16. The liquid crystal display according to claim 8 further comprising a second extension portion extended from said second signal line, said second extension portion is entirely located within said first hole, and said first and second extension portions are symmetrically extended from said second signal line.

17. The liquid crystal display according to claim 11, wherein said first and second supports are symmetrically aligned beside said bump.

18. The liquid crystal display according to claim 11, wherein the said first and second supports are connected to each other.

19. The liquid crystal display according to claim 15, wherein said second substrate is contacted with said first support, but not contacted with said second support.

* * * * *